(12) United States Patent
Zheng et al.

(10) Patent No.: US 10,129,113 B2
(45) Date of Patent: Nov. 13, 2018

(54) METHOD AND APPARATUS FOR EVALUATING HARDWARE BASED ON CLOUD SERVER

(71) Applicant: Tencent Technology (Shenzhen) Company Limited, Shenzhen (CN)

(72) Inventors: Bin Zheng, Shenzhen (CN); Haibo Wang, Shenzhen (CN); Xiongjun Pi, Shenzhen (CN); Weiguo Zhao, Shenzhen (CN); Xiaowen Liang, Shenzhen (CN); Zongkai Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 435 days.

(21) Appl. No.: 14/640,853

(22) Filed: Mar. 6, 2015

(65) Prior Publication Data

US 2015/0288580 A1 Oct. 8, 2015

Related U.S. Application Data

(63) Continuation of application No. PCT/CN2013/083560, filed on Sep. 16, 2013.

(30) Foreign Application Priority Data

Sep. 17, 2012 (CN) .......................... 2012 1 0344173

(51) Int. Cl.
*H04L 12/26* (2006.01)
*G06F 11/30* (2006.01)
(Continued)

(52) U.S. Cl.
CPC .......... *H04L 43/04* (2013.01); *G06F 11/3031* (2013.01); *G06F 11/3051* (2013.01);
(Continued)

(58) Field of Classification Search
CPC .................................. H04L 67/34; G06F 8/65
See application file for complete search history.

(56) References Cited

U.S. PATENT DOCUMENTS 5,765,138 A * 6/1998 Aycock ............ G06Q 10/06313
705/7.23
7,802,082 B2 * 9/2010 Kruse ....................... G06F 8/63
700/108

(Continued)

FOREIGN PATENT DOCUMENTS

| CN | 102368225 A | 3/2012 |
| CN | 102368239 A | 3/2012 |

OTHER PUBLICATIONS

The State Intellectual Property Office of the People's Republic of China (SIPO) Office Action 1 for 201210344173.6 dated Nov. 30, 2016 pp. 1-11.
(Continued)

*Primary Examiner* — Tom Y Chang
(74) *Attorney, Agent, or Firm* — Anova Law Group, PLLC

(57) ABSTRACT

The present invention relates to a method and apparatus for evaluating hardware based on a cloud server, the method comprising: detecting information on hardware components of a computer terminal; determining the type of the computer terminal based on information on the hardware components of the computer terminal; and scoring the hardware components of the computer terminal based on information on the hardware components and the type of the computer terminal. In accordance with embodiments of the present invention, the hardware components are scored based on the type of the computer terminal, and the relevant database are timely updated to ensure the accuracy of the hardware scoring.

10 Claims, 2 Drawing Sheets

(51) Int. Cl.
*G06F 11/34* (2006.01)
*H04L 29/08* (2006.01)
*G06F 8/65* (2018.01)

(52) U.S. Cl.
CPC .......... *G06F 11/3442* (2013.01); *H04L 43/08* (2013.01); *H04L 67/10* (2013.01); *G06F 8/65* (2013.01); *H04L 67/34* (2013.01)

(56) References Cited

U.S. PATENT DOCUMENTS

2006/0218634 A1* 9/2006 Sodhi .................... G06Q 30/02
 726/22
2009/0259890 A1 10/2009 Lund et al.

OTHER PUBLICATIONS

Computer & Network, "Concerned about computer performance with the computer housekeeper hardware detection tools", Apr. 30, 2012, pp. 1-5.

* cited by examiner

METHOD AND APPARATUS FOR EVALUATING HARDWARE BASED ON CLOUD SERVER

CROSS-REFERENCE TO RELATED APPLICATIONS

This application is a continuation of International Patent Application No. PCT/CN2013/083560, entitled "Method and Apparatus for Evaluating Hardware Based on a Cloud Server," filed on Sep. 16, 2013. This application claims the benefit and priority of Chinese Patent Application No. 201210344173.6, entitled "Method and Apparatus for Evaluating Hardware Based on a Cloud Server," filed on Sep. 17, 2012. The entire disclosures of each of the above applications are incorporated herein by reference.

TECHNICAL FIELD

The present invention relates to computer technologies, and more particularly to a method and apparatus for evaluating hardware based on a cloud server.

BACKGROUND

With the development of technology, the speed of upgrading computer hardware is becoming faster and faster. Some users who lack computer hardware knowledge may know that their computers need to be upgraded to meet the requirements of their work or entertainment, but do not know the hardware configuration of their computers, or how to upgrade hardware to improve the overall performance of the computers.

Thus, some software developers have developed hardware evaluation software for detecting computer hardware information and assigning corresponding scores for hardware components based on the hardware information. Such software merely provides scores for hardware components based on the hardware configuration, and adds all the scores to derive a total score. Such scoring method does not take into account the types of computers or the compatibility among the hardware components, and often results in inaccurate scores. For example, for an entertainment computer, if the score for the video card is low, and the scores for other hardware components are relatively high, such scoring method would derive a relatively high total score, which is not accurate. For another example, if the scores for the motherboard and the video card are both relatively high, but the compatibility between them is poor, and the motherboard does not fully utilize the functionality of the video card, such scoring method would also derive a relatively high total score, which is also not accurate. In addition, if such software is not updated timely, inaccurate scores can also be obtained from an outdated version of the software.

Thus, it is desirable to provide a method and apparatus for evaluating hardware based on a cloud server to address issues in the prior art.

SUMMARY OF THE INVENTION

The embodiments of the present invention aims to a method and apparatus for evaluating hardware based on a cloud server wherein the hardware components are scored based on the type of the computer terminal and the relevant database can be timely updated, and addresses the issue of inaccurate hardware scoring in the prior art.

In accordance with the embodiment of the present invention, a method for scoring hardware based on a cloud server is provided, the method comprising: detecting information on hardware components of a computer terminal; determining the type of the computer terminal based on information on the hardware components of the computer terminal; and scoring the hardware components of the computer terminal based on information on the hardware components and the type of the computer terminal.

In accordance with the embodiment of the present invention, an apparatus for evaluating hardware based on a cloud server is provided, the apparatus comprising: an information detection module for detecting information on hardware components of a computer terminal; a type determination module for determining the type of the computer terminal based on information on the hardware components of the computer terminal; and a scoring module for scoring the hardware components of the computer terminal based on information on the hardware components and the type of the computer terminal.

The present invention provides to a method and apparatus for evaluating hardware based on a cloud server. In accordance with embodiments of the present invention, the hardware components are scored based on the type of the computer terminal, and the relevant database are timely updated to addresses the issue of inaccurate hardware scoring in the prior art.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate technical feature, and advantages of the embodiments of the present invention, various embodiments of the present invention will be further described in conjunction with the accompanying drawings.

Figure 1:
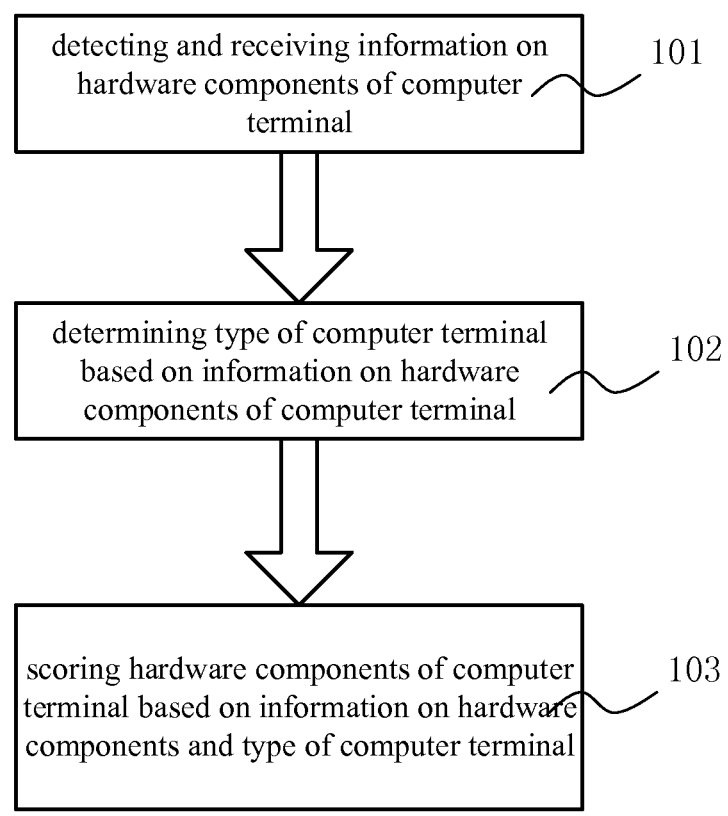
FIG. 1 is an exemplary flowchart for a method for evaluating hardware based on a cloud server in accordance with a preferred embodiment of the present invention.

FIG. 1 is an exemplary flowchart for a method for evaluating hardware based on a cloud server in accordance with a preferred embodiment of the present invention. The method for evaluating hardware based on a cloud server comprises the following steps:

Step 101: detecting information on hardware components of a computer terminal;

Step 102: determining the type of the computer terminal based on information on the hardware components of the computer terminal; and Step 103: scoring the hardware components of the computer terminal based on information on the hardware components and the type of the computer terminal.

In this embodiment, the method for evaluating hardware based on a cloud server ends at Step 103.

The method for evaluating hardware in accordance with embodiments of the present invention is based on a cloud server, i.e., the detection, collection and analysis of the hardware information of the computer terminal is performed on a cloud server, and the hardware scores are eventually sent back to the computer terminal. The cloud server can timely update its database, which ensures the accuracy of the method for evaluation hardware. The implementation details of the various steps in the method for evaluation hardware based on a cloud server in accordance with a preferable embodiment will be described below.

In Step 101, information on hardware components of a computer terminal is detected. Information on hardware components of the computer terminal includes hardware parameters and identifications for the important hardware components of the computer terminal, such as the CPU, memory, video card, and motherboard, and the detected information is transmitted to the cloud server.

Subsequently, Step 102 is performed.

Figure 2:
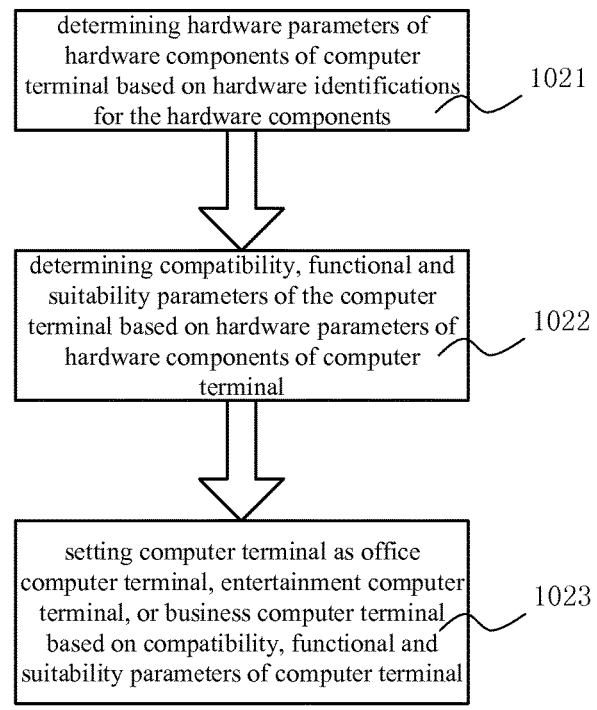
FIG. 2 is an exemplary flowchart for a step in the method for evaluating hardware based on a cloud server with a preferred embodiment of the present invention.

In Step 102, the type of the computer terminal is determined based on information on the hardware components of the computer terminal. FIG. 2 is an exemplary flowchart for Step 102 in the method for evaluating hardware based on a cloud server with another preferred embodiment of the present invention. As shown in FIG. 2, Step 102 comprising the following steps:

Step 1021: determining hardware parameters of the hardware components of the computer terminal based on the hardware identifications for the hardware components of the computer terminal.

In this step, the cloud server will confirm and supplement information on hardware components of the computer terminal based on the hardware identifications. If a hardware parameter is incomplete or incorrect, the cloud server can obtain the complete and correct hardware parameter through matching the hardware identification with data in the corresponding preset database.

Step 1022: determining a compatibility parameter, a functional parameter and a suitability parameter of the computer terminal based on the hardware parameters of the hardware components of the computer terminal.

The compatibility parameter indicates the compatibility of the hardware components, the functional parameter indicates the maximum operation speed of the hardware components, and the suitability parameter indicates volume, weight, type and number of available interfaces of the hardware components. The compatibility parameter, functional parameter and suitability parameter of the computer terminal are set in accordance to the prevailing configuration on the market for office computer terminal, entertainment computer terminal, and business computer terminal, and may be updated based on the change in hardware price and hardware upgrades.

The focus of office computer terminal is the stability of the computer terminal, the focus of entertainment computer terminal is the gaming and audio-video capability of the computer terminal, and the focus of business computer terminal is the portability and external interface of the computer terminal. The cloud server can preset corresponding database according to users need for queries of computer terminal parameters (compatibility parameter, functional parameter and suitability parameters). For example, if the prices for office computer terminal and entertainment computer terminal are the same or similar, then the functional parameters for office computer terminal and entertainment computer terminal may also be the same or similar. The preset database can be established based on users need, as long as it can handle queries based on the types (office, entertainment or business) of the computer terminal.

Accordingly, the hardware parameters of the hardware components of the computer terminal can be searched in the preset database to determine the compatibility parameter, functional parameter and suitability parameter of the computer terminal.

Step 1023: setting the computer terminal as an office computer terminal, an entertainment computer terminal, or a business computer terminal based on the compatibility parameter, the functional parameter and the suitability parameter of the computer terminal.

In Step 1022, the hardware components of the computer terminal are parameterized through the preset database, and the compatibility parameter, functional parameter and suitability parameter of the computer terminal are obtained. In Step 1023, the computer terminal with relative high compatibility parameter (i.e., reaches a certain threshold value) is set as an office computer terminal, the computer terminal with relative high functional parameter (i.e., reaches a certain threshold value) is set as an entertainment computer terminal, and the computer terminal with relative high suitability parameter (i.e., reaches a certain threshold value) is set as a business computer terminal. Thus, each computer terminal is classified to obtain its type according to the use.

Subsequently, Step 103 is performed.

In Step 103, the hardware components of the computer terminal are scored based on information on the hardware components and the type of the computer terminal. First, the hardware components of the computer terminal are scored based on information on the hardware components in accordance with a preset rule. The obtained scores are objective scores based on the hardware components themselves. The hardware scoring rule can be set based on the need of the user or implemented using hardware scoring software.

Subsequently, the scores of the hardware components are amended based on the type, the compatibility parameter, the functional parameter and the suitability parameter of the computer terminal. For different computer terminals, particular different types of computer terminals, the functions of the hardware components are different, and the scores of the hardware components are amended based on the type of the computer terminal.

For example, if the computer terminal is an office computer terminal, the scores of the hardware components are amended based on the compatibility parameter, i.e., the scores of the hardware components with good compatibility will factor in the compatibility parameter (such as by multiplying an coefficient greater than 1) to increase the ratio of the scores of these hardware components in the total scores; if the computer terminal is an entertainment computer terminal, the scores of the hardware components are amended based on the functional parameter, i.e., the scores of the hardware components supporting gaming and audio-video functionality will factor in the functional parameter to increase the ratio of the scores of these hardware components in the total scores; if the computer terminal is a business computer terminal, the scores of the hardware components are amended based on the suitability parameter, i.e., the scores of the hardware components with small volume, light weigh, and multiple interfaces will factor in the suitability parameter to increase the ratio of the scores of these hardware components in the total scores. The hardware components whose scores will be amended and the amount of the amendment can be set based on the user's need.

Accordingly, for different types of computer terminals, the cloud server will send back hardware scores based on the type of the computer terminal which better reflect the performance of the hardware components in actual use.

Thus, the method for evaluating hardware based on a cloud server completes all its steps.

In accordance with an embodiment of the present invention, the method for evaluating hardware based on a cloud server can also be used to provide multiple hardware upgrading proposals based on the scores of hardware components of the computer terminal.

Multiple hardware total score zones can be preset on the cloud server, each representing a computer server of a different level. The cloud server will provide multiple hardware upgrading proposals based on the scores of the hardware components of the computer terminal obtained in Step 103, wherein the sum of the scores of the hardware components in accordance with each hardware upgrading proposal falls within a different hardware total score zone. In another word, the cost of the upgrading for each upgrading proposal is different, and the user can choose the most appropriate hardware upgrading proposal based on his needs.

After the user finalizes his hardware upgrading plan, the method of evaluating hardware based on a cloud server in accordance with embodiments of the present invention also provides hardware information for at least one hardware component to be upgraded to, which helps the user to purchase and upgrade to the hardware components.

Figure 3:
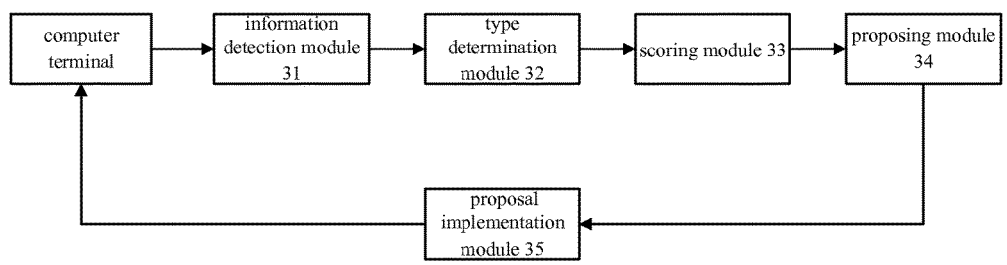
FIG. 3 is an exemplary schematic diagram for an apparatus for evaluating hardware based on a cloud server in accordance with another preferred embodiment of the present invention.

In accordance with an embodiment of the present invention, an apparatus for evaluating hardware based on a cloud server is provided. FIG. 3 is an exemplary schematic diagram for an apparatus for evaluating hardware based on a cloud server in accordance with yet another preferred embodiment of the present invention. As shown in FIG. 3, the apparatus for evaluating hardware based on a cloud server includes: an information detection module 31, a type determination module 32, a scoring module 33, a proposing module 34, and a proposal implementation module 35.

The information detection module 31 is configured for detecting information on hardware components of a computer terminal; the type determination module 32 is configured for determining the type of the computer terminal based on information on the hardware components of the computer terminal; and the scoring module 33 is configured for scoring the hardware components of the computer terminal based on information on the hardware components and the type of the computer terminal; the proposing module 34 is configured for presetting a plurality of hardware total score zones; and providing a plurality of hardware upgrading proposals based on the scores of the hardware components of the computer terminal, wherein the sum of the scores of the hardware components in accordance with each hardware upgrading proposal falls within a different hardware total score zone; and the proposal implementation module 35 is configured for determining hardware information for at least one hardware component to be upgraded to in accordance with the hardware upgrading proposals.

The type determination module 32 includes a hardware parameter determination unit, a type parameter determination unit and a type setting unit. The hardware parameter determination unit is configured for determining hardware parameters of the hardware components of the computer terminal based on the hardware identifications for the hardware components of the computer terminal; the type parameter determination unit is configured for determining a compatibility parameter, a functional parameter and a suitability parameter of the computer terminal based on the hardware parameters of the hardware components of the computer terminal; and the type setting unit for setting the computer terminal as a computer terminal selected from a group consisting of an office computer terminal, an entertainment computer terminal, and a business computer terminal based on the compatibility parameter, the functional parameter and the suitability parameter of the computer terminal.

The scoring module 33 includes a scoring unit and an amendment unit. The scoring unit is configured for scoring the hardware components of the computer terminal based on information on the hardware components in accordance with a preset rule; and the amendment unit is configured for amending the scores of the hardware components based on the type, the compatibility parameter, the functional parameter and the suitability parameter of the computer terminal.

When the apparatus for evaluating hardware based on a cloud server is in use, the information detection module 31 detects information on hardware components of a computer terminal. Information on hardware components of the computer terminal includes hardware parameters and identifications for the important hardware components of the computer terminal, such as the CPU, memory, video card, and motherboard, and the detected information is transmitted to the cloud server. The operational principles of the information detection module 31 are the same or similar to Step 101 of the method for evaluating hardware based on a cloud server in the embodiment above, and will not be repeated here.

The hardware parameter determination unit in the type determination module 32 is subsequently used to determine hardware parameters of the hardware components of the computer terminal based on the hardware identifications for the hardware components of the computer terminal. The type parameter determination unit determining a compatibility parameter, a functional parameter and a suitability parameter of the computer terminal based on the hardware parameters of the hardware components of the computer terminal. The type setting unit in the type determination module 32 is configured for setting the computer terminal as an office computer terminal when compatibility parameter reaches a first threshold value, as an entertainment computer terminal when reaches a second threshold value and as a business computer terminal when the suitability parameter reaches a third threshold value. The operational principles of the type determination module 32 are the same or similar to Step 102 of the method for evaluating hardware based on a cloud server in the embodiment above, and will not be repeated here.

The scoring unit of the scoring module 33 is subsequently configured for scoring the hardware components of the computer terminal based on information on the hardware components in accordance with a preset rule. The amendment unit of the scoring module 33 is configured for amending the scores of the hardware components based on the type, the compatibility parameter, the functional parameter and the suitability parameter of the computer terminal. The operational principles of the scoring module 33 are the same or similar to Step 103 of the method for evaluating hardware based on a cloud server in the embodiment above, and will not be repeated here.

In accordance with the embodiment of the present invention, the apparatus for evaluating hardware based on a cloud server further includes: a proposing module 34 and a proposal implementation module 35.

The proposing module 34 can provide multiple hardware upgrading proposals based on the scores of hardware components of the computer terminal. The proposing module 34 presets multiple hardware total score zones, each representing a computer server of a different level. The proposing module 34 also provides multiple hardware upgrading proposals based on the scores of the hardware components of the computer terminal, wherein the sum of the scores of the hardware components in accordance with each hardware upgrading proposal falls within a different hardware total score zone. In another word, the cost of the upgrading for each upgrading proposal is different, and the user can choose the most appropriate hardware upgrading proposal based on his needs.

After the user finalizes its hardware upgrading plan, proposal implementation module 35 also provides hardware information for at least one hardware component to be upgraded to, which helps the user to purchase and upgrade to the hardware components.

A specific embodiment of the present invention will be provided below to better illustrate the operational principles of the method and apparatus for evaluating hardware based on a cloud server.

For example, the cloud server detects the following hardware information of the computer terminal:
CPU: AMD Athlon II X4 640 3.0 Hz;
Motherboard: MSI 870-C45 V2;
Memory: Kingston DDR3 1333 2G;
Hard drive: Seagate Barracuda 7200.12 500G SATA2 single disc;
Video card: NVIDIA GeForce GTS 450 SE 1024M.

Based on the above hardware information, the Cloud Server determines that the functional parameter is relative high (for example, the function parameter is 70, the compatibility and applicability parameters are 60), and this computer terminal is set as an entertainment computer terminal. Then this computer terminal is evaluated as an entertainment computer terminal. Since video card and CPU are important for the performance of entertainment computer terminal, the scores for the video card and CPU will be multiplied by a coefficient of 1.2, while the score of the hard drive will be multiplied by a coefficient of 08, and the scores of the motherboard and memory will be multiplied by a coefficient of 1.0. If the score for each hardware component is 1000, the total score before the amendment is 5000, and the total score after the amendment is 5200. Three upgrading proposals will be provided based on the obtained scores:
Proposal 1: Memory Upgrade: Kingston DDR3 1333 4G;
Proposal 2: Memory Upgrade: Kingston DDR3 1333 4G;
Video Card Upgrade: NVIDIA GeForce GTX 550 Ti 1024M.
Proposal 3: Memory Upgrade: Kingston DDR3 1333 4G;
CPU Upgrade: AMD Yi Dragon II X4 955 3.2 Hz;
Video Card Upgrade: NVIDIA GeForce GTX 550 Ti 1024M.

The user can choose the most suitable upgrade option according to its hardware upgrade requirement, and the cloud server completes the tasks of evaluating hardware and providing the corresponding hardware upgrade recommendations.

The present invention provides to a method and apparatus for evaluating hardware based on a cloud server. In accordance with embodiments of the present invention, the hardware components are scored based on the type of the computer terminal, and the relevant database are timely updated to ensure accuracy of the scores and address the issue of inaccurate hardware scoring in the prior art. Furthermore, corresponding hardware upgrading proposals are provided based on the obtained scores of the hardware components of the computer terminal, which helps the user purchase and upgrade to the hardware components.

Those skilled in the art will understand that all or part of the embodiments of the present invention can be implemented by computer hardware, or by a computer program controlling the relevant hardware. The computer program can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for evaluating hardware based on a cloud server, the method comprising:
    detecting information on hardware components of a computer terminal;
    based on the information on the hardware components of the computer terminal, determining, using a hardware processor of the cloud server, a compatibility parameter, a functional parameter and a suitability parameter of the computer terminal;
    determining, using the hardware processor of the cloud server, a type of the computer terminal based on comparing the compatibility parameter, the functional parameter and the suitability parameter of the computer terminal with one or more threshold values; and
    scoring, using the hardware processor of the cloud server, the hardware components of the computer terminal based on the information on the hardware components and the type of the computer terminal,
    wherein the information on hardware components of the computer terminal comprises hardware identifications for the hardware components of the computer terminal,
    wherein determining the compatibility parameter, the functional parameter and the suitability parameter of the computer terminal comprises:
        determining hardware parameters of the hardware components of the computer terminal based on the hardware identifications for the hardware components of the computer terminal; and
        determining the compatibility parameter, the functional parameter and the suitability parameter of the computer terminal based on the hardware parameters of the hardware components of the computer terminal,
    wherein determining the type of the computer terminal comprises: setting the computer terminal as a first-type computer terminal when the compatibility parameter reaches a first threshold value related to stability, as a second-type computer terminal when the functional parameter reaches a second threshold value related to gaming and audio-video capability, and as a third-type computer terminal when the suitability parameter reaches a third threshold value related to portability and external interfaces; and wherein scoring the hardware components of the computer terminal comprises:

scoring the hardware components of the computer terminal based on the information on the hardware components in accordance with a preset rule; and after scoring the hardware components, amending the scores of the hardware components based on the type of the computer terminal, including:

amending the scores of the hardware components by increasing a ratio of the compatibility parameter in a total score if the type of the computer terminal is the first-type computer terminal, amending the scores of the hardware components by increasing a ratio of the functional parameter in the total score if the type of the computer terminal is the second-type computer terminal, and amending the scores of the hardware components by increasing a ratio of the suitability parameter in the total score if the type of the computer terminal is the third-type computer terminal.

2. The method of claim 1, wherein determining the compatibility parameter, the functional parameter and the suitability parameter of the computer terminal based on the hardware parameters of the hardware components of the computer terminal comprises:

searching hardware parameters of the hardware components of the computer terminal in a preset database to determine the compatibility parameter, the functional parameter and the suitability parameter of the computer terminal, wherein the compatibility parameter indicates the compatibility of the hardware components, the functional parameter indicates the maximum operation speed of the hardware components, and the suitability parameter indicates volume, weight, type and number of available interfaces of the hardware components.

3. The method of claim 1, further comprises:

presetting a plurality of hardware total score zones; and providing a plurality of hardware upgrading proposals based on the scores of the hardware components of the computer terminal, wherein the sum of the scores of the hardware components in accordance with each hardware upgrading proposal falls within a different hardware total score zone.

4. The method of claim 3, further comprises:

determining hardware information for at least one hardware component to be upgraded to in accordance with the hardware upgrading proposals.

5. An apparatus for evaluating hardware based on a cloud server, comprising one or more hardware processors, memory, and one or more program modules stored in the memory and to be executed by the one or more hardware processors, the one or more program modules comprising:

an information detection module for detecting information on hardware components of a computer terminal;

a type determination module for:

based on the information on the hardware components of the computer terminal, determining, using a hardware processor of the cloud server, a compatibility parameter, a functional parameter and a suitability parameter of the computer terminal, and determining a type of the computer terminal based on comparing the compatibility parameter, the functional parameter and the suitability parameter of the computer terminal with one or more threshold values; and a scoring module for scoring the hardware components of the computer terminal based on the information on the hardware components and the type of the computer terminal, wherein the information on hardware components of the computer terminal comprises hardware identifications for the hardware components of the computer terminal, wherein the type determination module comprises:

a hardware parameter determination unit for determining hardware parameters of the hardware components of the computer terminal based on the hardware identifications for the hardware components of the computer terminal;

a type parameter determination unit for determining the compatibility parameter, the functional parameter and the suitability parameter of the computer terminal based on the hardware parameters of the hardware components of the computer terminal; and a type setting unit for setting the computer terminal as a first-type computer terminal when the compatibility parameter reaches a first threshold value related to stability, as a second-type computer terminal when the functional parameter reaches a second threshold value related to gaming and audio-video capability, and as a third-type computer terminal when the suitability parameter reaches a third threshold value related to portability and external interfaces;

wherein the scoring module further comprises:

a scoring unit for scoring the hardware components of the computer terminal based on the information on the hardware components in accordance with a preset rule; and an amendment unit for amending the scores of the hardware components based on the type, the compatibility parameter, the functional parameter and the suitability parameter of the computer terminal, including:

amending the scores of the hardware components by increasing a ratio of the compatibility parameter in a total score if the type of the computer terminal is the first-type computer terminal, amending the scores of the hardware components by increasing a ratio of the functional parameter in the total score if the type of the computer terminal is the second-type computer terminal, and amending the scores of the hardware components by increasing a ratio of the suitability parameter in the total score if the type of the computer terminal is the third-type computer terminal.

6. The apparatus of claim 5, wherein a type parameter determination unit is configured for:

searching hardware parameters of the hardware components of the computer terminal in a preset database to determine the compatibility parameter, the functional parameter and the suitability parameter of the computer terminal, wherein the compatibility parameter indicates the compatibility of the hardware components, the functional parameter indicates the maximum operation speed of the hardware components, and the suitability parameter indicates volume, weight, type and number of available interfaces of the hardware components.

7. The apparatus of claim 5, wherein the one or more program modules further comprise:

a proposing module for presetting a plurality of hardware total score zones, and providing a plurality of hardware upgrading proposals based on the scores of the hardware components of the computer terminal, wherein the sum of the scores of the hardware components in accordance with each hardware upgrading proposal falls within a different hardware total score zone.

8. The apparatus of claim 7, wherein the one or more program modules further comprise:
a proposal implementation module for determining hardware information for at least one hardware component to be upgraded to in accordance with the hardware upgrading proposals.

9. A non-transitory computer-readable medium having stored thereon computer-executable instructions that, when executed by a hardware processor of a cloud server, cause the hardware processer to perform a method for evaluating hardware based on the cloud server, the method comprising:
detecting information on hardware components of a computer terminal;
based on the information on the hardware components of the computer terminal, determining a compatibility parameter, a functional parameter and a suitability parameter of the computer terminal;
determining a type of the computer terminal based on comparing the compatibility parameter, the functional parameter and the suitability parameter of the computer terminal with one or more threshold values; and
scoring the hardware components of the computer terminal based on the information on the hardware components and the type of the computer terminal,
wherein the information on hardware components of the computer terminal comprises hardware identifications for the hardware components of the computer terminal,
wherein determining the compatibility parameter, the functional parameter and the suitability parameter of the computer terminal comprises:
determining hardware parameters of the hardware components of the computer terminal based on the hardware identifications for the hardware components of the computer terminal; and
determining the compatibility parameter, the functional parameter and the suitability parameter of the computer terminal based on the hardware parameters of the hardware components of the computer terminal,
wherein determining the type of the computer terminal comprises: setting the computer terminal as a first-type computer terminal when the compatibility parameter reaches a first threshold value related to stability, as a second-type computer terminal when the functional parameter reaches a second threshold value related to gaming and audio-video capability, and as a third-type computer terminal when the suitability parameter reaches a third threshold value related to portability and external interfaces; and
wherein scoring the hardware components of the computer terminal comprises:
scoring the hardware components of the computer terminal based on the information on the hardware components in accordance with a preset rule; and
after scoring the hardware components, amending the scores of the hardware components based on the type of the computer terminal, including:
amending the scores of the hardware components by increasing a ratio of the compatibility parameter in a total score if the type of the computer terminal is the first-type computer terminal,
amending the scores of the hardware components by increasing a ratio of the functional parameter in the total score if the type of the computer terminal is the second-type computer terminal, and
amending the scores of the hardware components by increasing a ratio of the suitability parameter in the total score if the type of the computer terminal is the third-type computer terminal.

10. The non-transitory computer medium of claim 9, wherein determining a compatibility parameter, a functional parameter and a suitability parameter of the computer terminal based on the hardware parameters of the hardware components of the computer terminal comprises:
searching hardware parameters of the hardware components of the computer terminal in a preset database to determine the compatibility parameter, the functional parameter and the suitability parameter of the computer terminal, wherein the compatibility parameter indicates the compatibility of the hardware components, the functional parameter indicates the maximum operation speed of the hardware components, and the suitability parameter indicates volume, weight, type and number of available interfaces of the hardware components.

* * * * *